US005368357A

United States Patent [19]

Kalis, Jr. et al.

[11] Patent Number: 5,368,357

[45] Date of Patent: Nov. 29, 1994

[54] UTILITY TRUCK BODY WITH OPTION ATTACHMENT COMPONENTS

[75] Inventors: George Kalis, Jr.; Robert M. Lapsley, both of Wooster, Ohio

[73] Assignee: Stahl/Scott Fetzer Company, Wooster, Ohio

[21] Appl. No.: 61,165

[22] Filed: May 13, 1993

Related U.S. Application Data

[63] Continuation-in-part of Ser. No. 889,948, Jun. 2, 1992, Pat. No. 5,267,773.

[51] Int. Cl.[5] .......... B60R 9/00

[52] U.S. Cl. .......... 296/183; 296/37.6

[58] Field of Search .......... 296/183, 37.6, 167, 296/100; 224/42.42

[56] References Cited

U.S. PATENT DOCUMENTS

| | | | |
|---|---|---|---|
| 2,722,352 | 11/1955 | Dehnel | 296/37.6 X |
| 2,978,153 | 4/1961 | Brindle | 296/37.6 X |
| 3,326,595 | 6/1967 | Ogilvie | 296/37.6 |
| 3,722,910 | 3/1973 | Heckenlaible . | |
| 4,135,761 | 1/1979 | Ward | 296/37.6 |
| 4,216,990 | 8/1980 | Musgrove et al. | 296/37.6 X |
| 4,239,139 | 12/1980 | Bott . | |
| 4,248,558 | 2/1981 | Lechner . | |
| 4,469,261 | 9/1984 | Stapleton et al. . | |
| 4,500,020 | 2/1985 | Rasor . | |
| 4,705,317 | 11/1987 | Henri . | |
| 4,828,312 | 5/1989 | Kinkel et al. | 296/37.6 |
| 4,852,937 | 8/1989 | Lemieux | 296/183 |
| 4,900,080 | 2/1990 | Morris, II | 296/37.6 X |
| 4,911,348 | 3/1990 | Rasor et al. . | |
| 4,938,398 | 7/1990 | Hallsen | 296/37.6 X |
| 4,969,784 | 11/1990 | Yanke . | |

OTHER PUBLICATIONS

Hi-Lift Jack Company brochure.

*Primary Examiner*—Joseph Pape

*Attorney, Agent, or Firm*—Watts, Hoffmann, Fisher & Heinke

[57] ABSTRACT

A truck body is disclosed for mounting on a standard truck frame. The body includes extruded attachment components which run the full length of the body. The attachment components have T-slots formed beneath their surfaces for permitting attachment of optional equipment to the truck body. The attachment components are designed to conform to the shape of the truck body in an aesthetically pleasing manner. One type of extruded attachment component includes an integral hinge pin for rotatably supporting a toolbox lid.

11 Claims, 4 Drawing Sheets

UTILITY TRUCK BODY WITH OPTION ATTACHMENT COMPONENTS

CROSS-REFERENCES TO RELATED APPLICATIONS

This application is a continuation-in-part of U.S. application Ser. No. 7/889,948 filed on Jun. 2, 1992, now U.S. Pat. No. 5,267,773.

BACKGROUND OF THE INVENTION

1. Field of the Invention

The present invention relates to truck bodies, and more particularly, to truck bodies having slotted body components for attaching optional equipment and accessories to truck beds.

2. Description of Related Art

Utility truck bodies are often modified by tradesmen to fit their particular needs. For example, superstructures for enclosing the truck bed, tool racks, cargo securing devices, and other accessories are often bolted to the truck body. Typically, installation of such accessories required that numerous holes be drilled into the truck body. When it was desired to replace the accessories or add new ones, more drilling was necessary. The drilling of holes in the truck body resulted in water leakage into tool storage compartments and rust formation in addition to an unattractive appearance.

It is known to fasten a slotted rail to a truck body for providing a cargo-securing device. Typically, such rails are bolted to the truck body as an add-on accessory and do not conform to the shape of the truck body. That is, the bolt-on rails project from the truck bed. In addition to creating an unattractive appearance, the the rails sometimes interfere with cargo and reduce the usable dimensions of the bed. Furthermore, existing slotted rails have only one slot, thus limiting the flexibility of the rails.

SUMMARY OF THE INVENTION

An object of the invention is to provide an attachment component which serves to provide a hinge pin for rotatably supporting a toolbox lid.

In a preferred embodiment, the invention includes an extrusion for a truck body comprising the following: an outer surface adapted to conform to the shape of the outer surface of the truck body; an inner surface adapted to engage the surface of the vehicle body, the inner surface including structure for attaching the extrusion to the truck body; and an integral hinge pin formed on the outer surface having a longitudinal axis which is parallel to the longitudinal axis of the extrusion.

Other objects and advantages and a fuller understanding of the invention will be had from the following detailed description of the preferred embodiments and the accompanying drawings

BRIEF DESCRIPTION OF THE DRAWINGS

Preferred embodiments of the invention are shown in the accompanying drawings in which.

DESCRIPTION OF THE PREFERRED EMBODIMENTS

Figure 1:
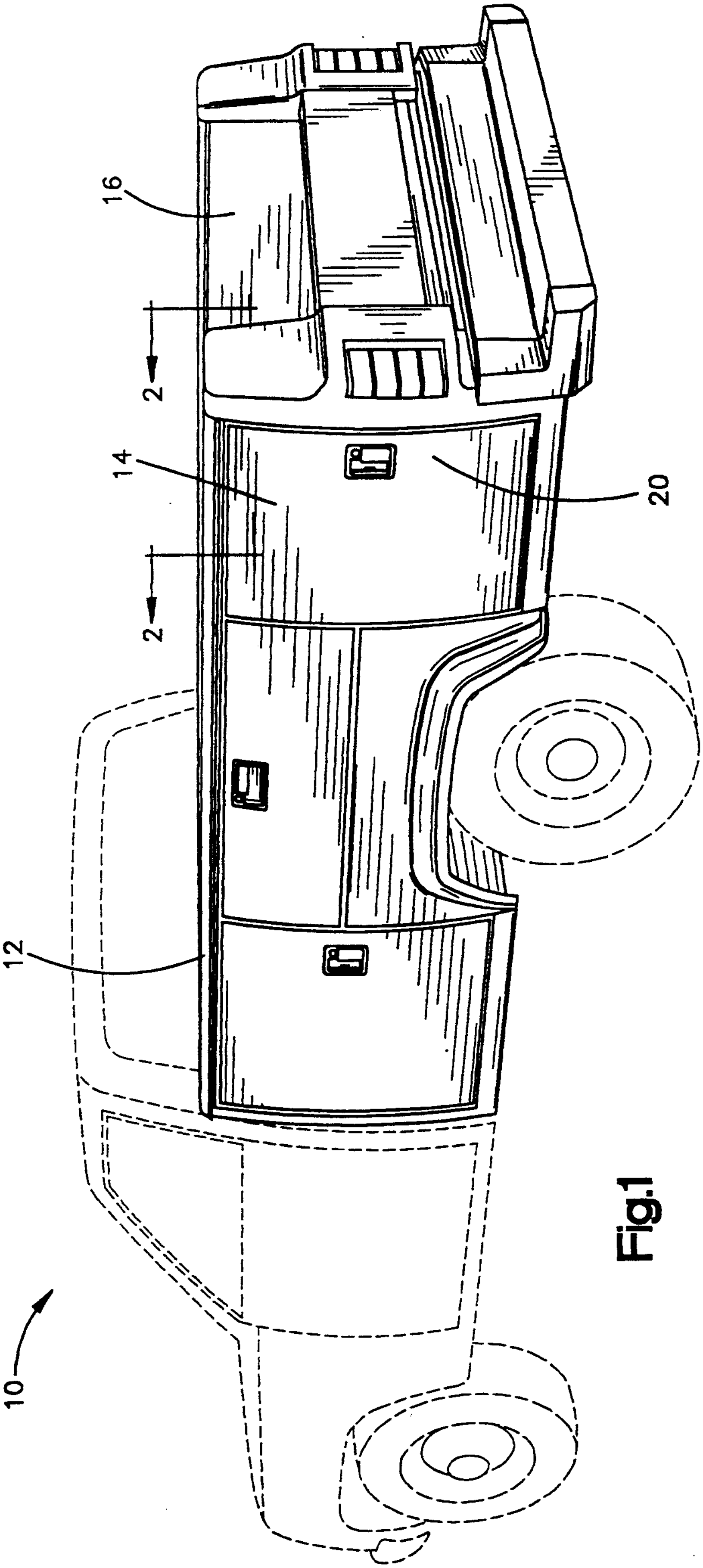
FIG. 1 is a perspective view of a utility truck body having attachment components embodying the present invention.

Referring to FIG. 1, a truck 10 having a utility body 12 is illustrated. The body 12 includes a pair of upstanding side structures 14, 16, a bed, and a plurality of storage compartments 18. A plurality of doors 20 cover the storage compartments 18. The two side structures are mirror images of one another. The body 12 is constructed to be fastened to the frame of a commercially available truck.

Figure 2:
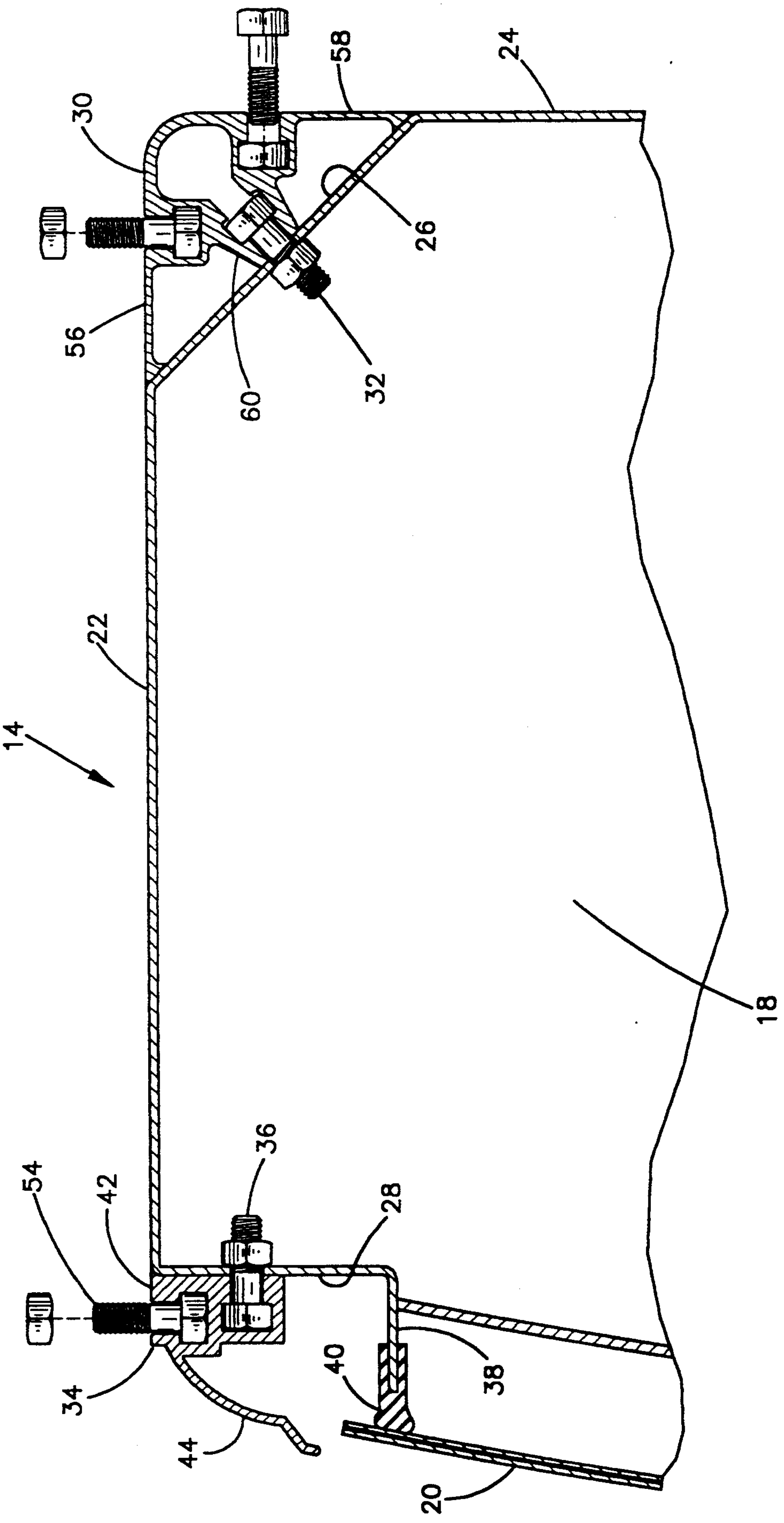
FIG. 2 is a partial cross sectional view as seen approximately from the plane indicated by the line 2—2 of FIG. 1.

Referring to FIG. 2, each side structure 14, 16 includes a top surface 22, an inner vertical surface 24, an inner connecting face 26, and an outer connecting face 28. An inner attachment component 30 is connected to the inner connecting face 26 by a fastener 32. Pun outer attachment component 34 is connected to the outer connecting face 28 with a fastener 36. The attachment components 30,34 which run along substantially the full length of the truck body 12, conform to the shape of the truck body 12 and form part of its aesthetically pleasing shape.

A flange 38 is formed about each storage compartment defining an access opening. A resilient seal 40 is provided between each flange 38 and each door 20. The doors 20 are hinged for swinging toward and away from the seals 40 to permit access to the storage compartments 18 from the outside of the truck 10.

Figure 3:
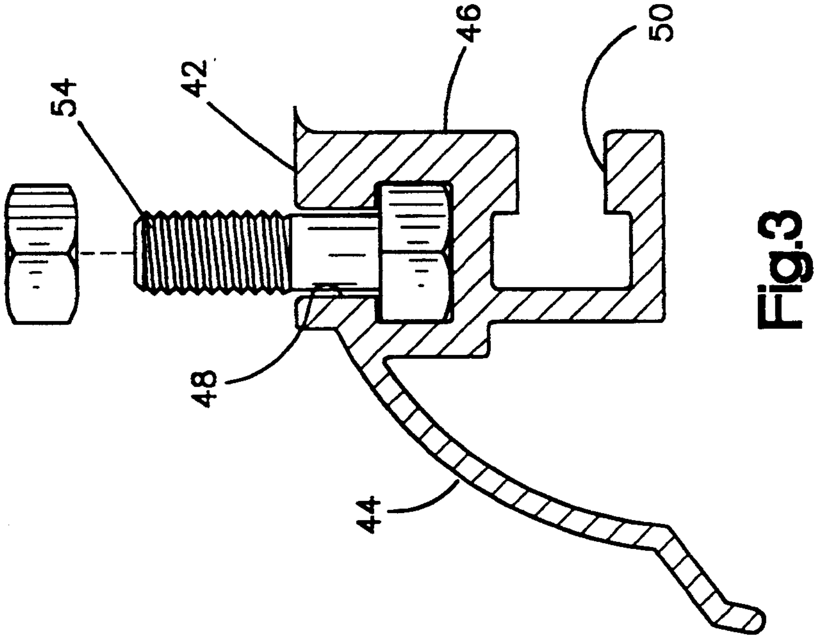
FIG. 3 is a cross sectional view of one attachment component of the truck body of FIG. 1.

Referring to FIGS. 2 and 3, the outer attachment component 34 is an extruded part including a top surface 42, a sloped side member 44, and a connecting surface 46. The component 34 also includes two parallel T-slots 48,50. One of the T-slots 50 is formed in the connecting surface 46 and serves to retain the fastener 36 for connecting the component 30 to the connecting face 28. The other T-slot 48 is formed in the top surface 42 and serves to receive one or more fasteners 54 for mounting optional equipment to the truck body 12. The sloping side member 44 serves as a rain deflector for deflecting rain away from the storage compartment seal 38. The side member 44 also forms an aesthetically pleasing curve for complementing the curvature of the doors 20.

Figure 4:
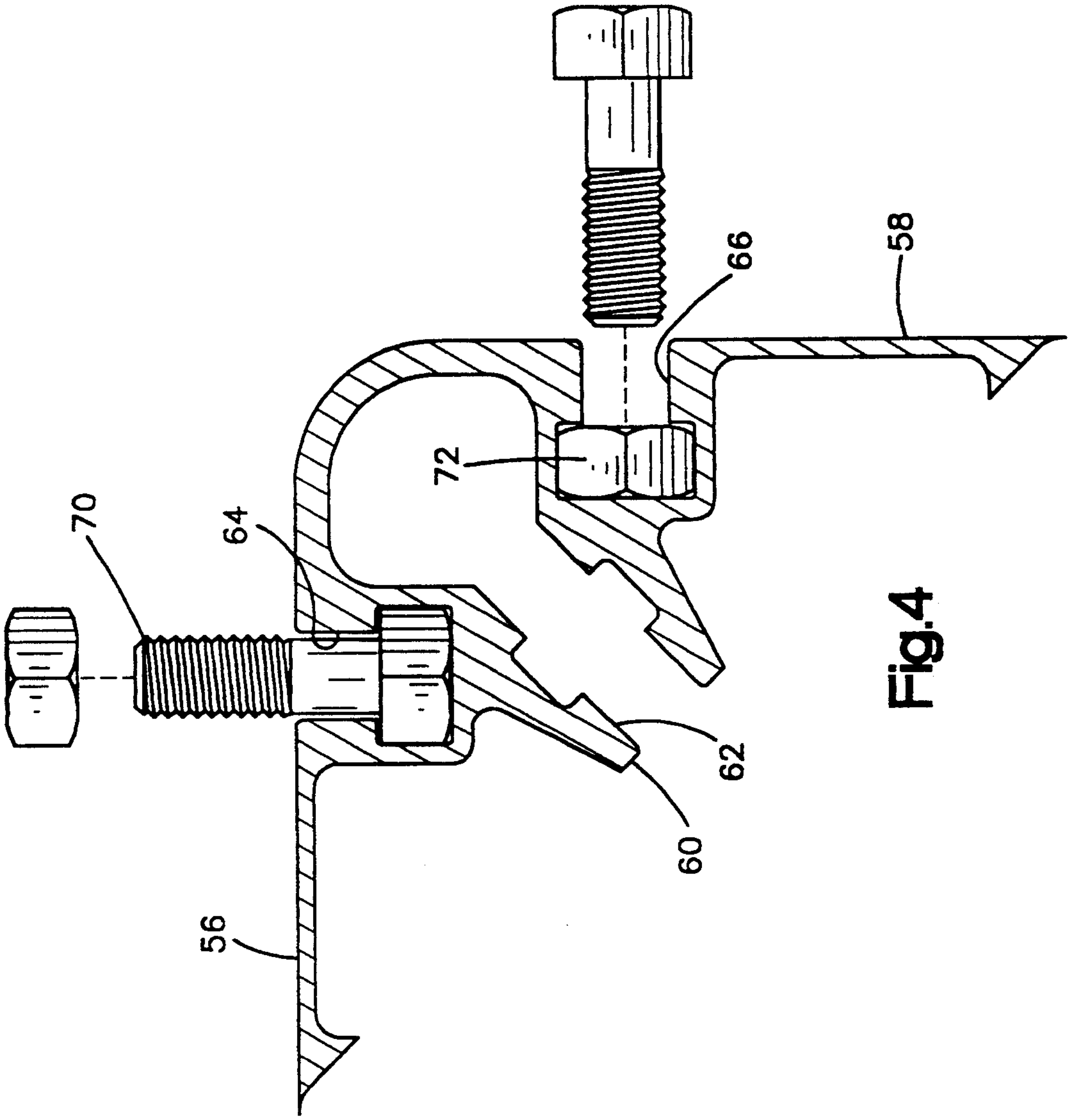
FIG. 4 is a cross sectional view of a second attachment component embodiment included in the truck body of FIG. 1.

Referring to FIGS. 2 and 4, the inner attachment component 30 is an extruded part including a top surface 56, a side surface 58, and a connecting portion 60. The component 30 includes three parallel T-slots 62, 64, 66. One of the T-slots 62 is formed in the connecting portion 60 and serves to retain fasteners 32 for connecting the component 30 to the connecting face 26. The other two T-slots 64, 66 are used for receiving fasteners 70,72 for mounting optional equipment to the truck body 12. One of the T-slots 64 faces a direction which is 90° from the direction faced by the other T-slot 66. Thus, one slot 64 faces upward and the other slot 66 faces inward toward the opposite side structure.

The T-slots 48,64,66 are constructed to slidably receive fasteners such as bolt heads, nuts, or a simple plates having threaded openings formed therein (not shown). The fasteners fit loosely within the slots 48,64,66 to permit rapid positioning of the fasteners to any location along the length of the truck body 12. The forward ends of the components 30,34 (near the truck cab) are unobstructed to permit fasteners to be inserted and removed from the T-slots. The T-slots 48,64,66 are below the surface of the truck body 12 and thus do not interfere with cargo and do not reduce the usable dimensions of the bed. Thus, for example, if a superstructure (not shown) is to be fastened to the truck body 12, it is not necessary to measure and drill holes in the body 12. A number of bolt heads are simply inserted into the T-slots 48,64 with their threaded portions projecting upwardly. The superstructure is lowered onto the body 12 while the bolts are aligned with openings in the superstructure. Finally, nuts are tightened on the bolts for securing the superstructure to the body 12.

Figure 5:
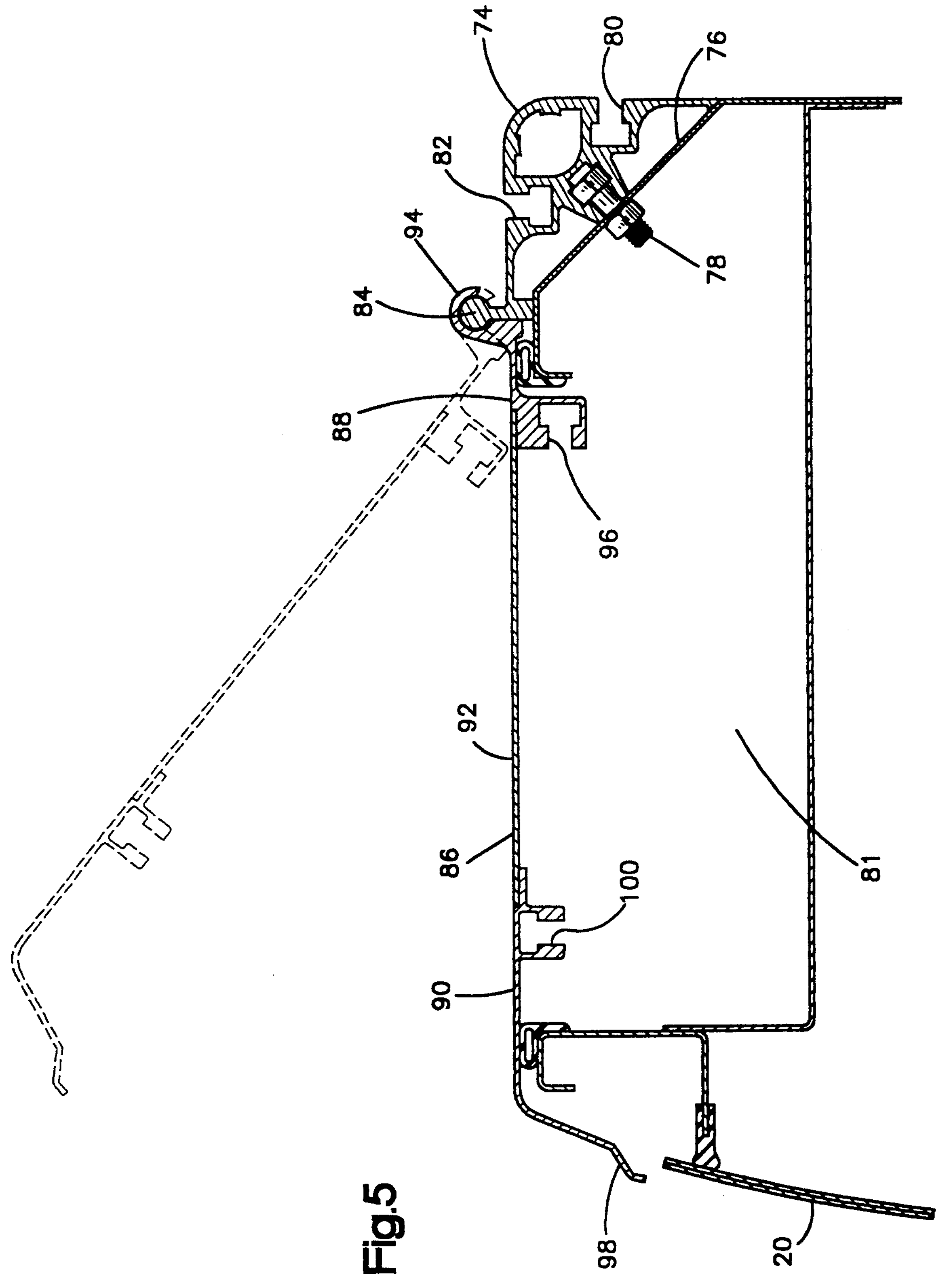
FIG. 5 is a partial cross sectional view of a second embodiment of an attachment component as seen from the same direction as FIG. 2.

Referring to FIG. 5, an attachment component 74 having a hinge pin is illustrated. The attachment component 74 is mounted to a connecting face 76 of the truck body with a fastener 78 which is preferably a nut and bolt. The component 74 is an extrusion having the same cross sectional shape along its entire length. The component 74 includes a pair of T-slots 80,82 located at right angles to one another which serve the same purpose as slots 64,66 discussed previously. The component 74 has an integrally formed circular hinge pin 84 as seen in FIG. 5. The hinge pin 84 serves as part of a hinge for rotatably supporting a lid 86.

The lid 86 serves to cover a storage compartment 81 formed in the side structures 14,16 of the truck body. The lid 86 is comprised of an inner extrusion 88, an outer extrusion 90, and a planar panel 92 connected between the inner 88 and outer 90 extrusions. The inner extrusion 88 has a circular portion 94 for cooperatively engaging the hinge pin 84 to form a hinge. When the lid 86 is lifted, the circular portion 94 rotates about the pin 84 as shown in phantom lines in FIG. 5. The inner extrusion 84 further includes a T-slot 96 which is preferably used to attach one end of a gas spring (not shown) to the lid 86 to control the lid3 s movement.

The outer extrusion 90 includes a door overhang 98 for deflecting rain away from the top of the storage compartment doors 20. The outer extrusion 90 further includes a T-slot 100 which is preferably used to attach a striker (not shown) for latching the lid 86.

While preferred embodiments of this invention have been described in detail, it will be apparent that certain modifications or alterations can be made without departing from the spirit and scope of the invention set forth in the appended claims.

We claim:

1. An extrusion for a truck body comprising:

a longitudinal axis;

an outer surface adapted to conform to the shape of an outer surface of the truck body;

an inner surface adapted to engage a portion of said truck body, said inner surface including means for attaching said extrusion to said truck body; and an integral hinge pin having a longitudinal axis which is parallel to the longitudinal axis of said extrusion.

2. An extrusion according to claim 1 and further including at least one T-slot formed in the outer surface for receiving fastener means for attaching optional equipment to said extrusion.

3. An extrusion according to claim 1 wherein said means for attaching is a T-slot formed on said inner surface for receiving fastener means.

4. An extrusion according to claim 1 wherein said outer surface includes a planar side surface adapted to be coplanar with a planar side of said truck body when said inner surface is attached to said truck body.

5. In a truck body having side surfaces, upstanding side structures, a bed between the side structures, and attachment means extending along said side structures longitudinally of said bed, the improvement wherein said attachment means comprises an elongated extrusion having a top surface that is coplanar with a top surface of one of said side structures, a side surface that is coplanar with a side surface of said one side structure, a connecting surface confronting a portion of said one side structure between said top and side surfaces of said one side structure, a T-slot in said extrusion extending along at least one of said top and side surfaces of said extrusion, wherein said extrusion further includes an integral hinge pin, the axis of which is parallel to the longitudinal axis of said extrusion.

6. A truck body according to claim 5 wherein T-slots extend along said top surface, side surface and connecting surface.

7. A truck body according to claim 6 wherein said T-slot extending along said side surface faces a direction which is at a right angle to the direction faced by said T-slot in said top surface.

8. A truck body according to claim 6 wherein said T-slot in said connecting surface is constructed to face a direction which is 135 degrees from the direction faced by said T-slot in either of said top or side surface.

9. An enclosure assembly for a truck utility body, said enclosure assembly comprising:

an extruded attachment for connection to a truck utility body;

an integral hinge pin formed on said attachment;

a lid for covering a storage compartment of the truck utility body; and an extruded hinge portion of said lid having a channel for receiving said hinge pin and supporting said lid for pivotal movement relative to said attachment.

10. The enclosure assembly in claim 9 further including a panel fixed to said hinge portion to form at least a portion of said lid.

11. The enclosure assembly in claim 9 further including a T-slot extruded into at least one of said attachment and said hinge portion for attaching optional structure.

* * * * *